US012674053B2

(12) United States Patent
Kim et al.

(10) Patent No.: US 12,674,053 B2
(45) Date of Patent: Jul. 7, 2026

(54) THERMOPLASTIC RESIN COMPOSITION AND MOLDED PRODUCT MANUFACTURED THEREFROM

(71) Applicant: LOTTE CHEMICAL CORPORATION, Seoul (KR)

(72) Inventors: Eun Jin Kim, Uiwang-si (KR); Dong Hui Chu, Uiwang-si (KR); Young Chul Kwon, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 276 days.

(21) Appl. No.: 18/265,327

(22) PCT Filed: Nov. 9, 2021

(86) PCT No.: PCT/KR2021/016188
§ 371 (c)(1),
(2) Date: Jun. 5, 2023

(87) PCT Pub. No.: WO2022/124593
PCT Pub. Date: Jun. 16, 2022

(65) Prior Publication Data
US 2024/0043675 A1     Feb. 8, 2024

(30) Foreign Application Priority Data

Dec. 11, 2020     (KR) ........................ 10-2020-0173658

(51) Int. Cl.
| | |
|---|---|
| *C08L 25/12* | (2006.01) |
| *A01N 25/10* | (2006.01) |
| *A01N 59/16* | (2006.01) |
| *A01P 1/00* | (2006.01) |
| *C08K 3/22* | (2006.01) |
| *C08K 3/40* | (2006.01) |

(52) U.S. Cl.
CPC .............. *C08L 25/12* (2013.01); *A01N 25/10* (2013.01); *A01N 59/16* (2013.01); *A01P 1/00* (2021.08); *C08K 3/22* (2013.01); *C08K 3/40* (2013.01); *C08K 2003/2296* (2013.01); *C08K 2201/014* (2013.01); *C08L 2203/30* (2013.01); *C08L 2205/03* (2013.01); *C08L 2207/53* (2013.01)

(58) Field of Classification Search
CPC .. C08L 25/12; C08L 2203/30; C08L 2205/03; C08L 2207/53; A01P 1/00; A01N 25/10; A01N 59/16; C08K 3/22; C08K 3/40; C08K 2003/2296; C08K 2201/014
See application file for complete search history.

(56) References Cited

U.S. PATENT DOCUMENTS

| | | | |
|---|---|---|---|
| 4,356,300 A | 10/1982 | Isler et al. | |
| 2019/0322854 A1* | 10/2019 | Yang ........................ | H01B 1/12 |
| 2020/0354561 A1 | 11/2020 | Sim et al. | |
| 2022/0186019 A1* | 6/2022 | Eim ........................ | C08L 33/12 |
| 2023/0151200 A1 | 5/2023 | Kim et al. | |

FOREIGN PATENT DOCUMENTS

| | | |
|---|---|---|
| JP | 55-133424 A | 10/1980 |
| JP | 56-045419 A | 4/1981 |
| JP | 08-027306 A | 1/1996 |
| JP | 11-35787 A | 2/1999 |
| JP | 2004-067753 A | 3/2004 |
| JP | 3577145 B2 * | 10/2004 |
| JP | 3752710 B2 | 3/2006 |
| JP | 2018-143962 A | 9/2018 |
| JP | 2020-503402 A | 1/2020 |
| JP | 2020-536984 A | 12/2020 |
| JP | 2022-530473 A | 6/2022 |
| KR | 10-0204926 B1 | 6/1999 |
| KR | 10-2020-0065139 A | 6/2020 |
| KR | 10-2020-0127065 A | 11/2020 |
| WO | 2022/080640 A1 | 4/2022 |
| WO | 2022/124593 A1 | 6/2022 |

OTHER PUBLICATIONS

JP 3577145 B2 Machine Translation (Year: 2004).*
International Search Report in counterpart International Application No. PCT/KR2021/016188 dated Feb. 17, 2022, pp. 1-6.
Office Action in counterpart Japanese Patent Application No. 2023-533352 dated Aug. 5, 2025, pp. 1-4.

* cited by examiner

*Primary Examiner* — Travis M Figg
(74) *Attorney, Agent, or Firm* — Additon, Pendleton & Witherspoon, P.A.

(57) ABSTRACT

A thermoplastic resin composition of the present invention comprises about 100 parts by weight of a rubber-modified aromatic vinyl-based copolymer resin; about 5 to about 25 parts by weight of a polyetheresteramide block copolymer; about to about 1.5 parts by weight of a silver (Ag)-based compound; and about 1 to about 15 parts by weight of zinc oxide, wherein the weight ratio of the polyetheresteramide block copolymer and the sum of the silver-based compound and the zinc oxide (polyetheresteramide block copolymer: silver-based compound+zinc oxide) is about 1:0.1 to about 1:2. The thermoplastic resin composition has excellent antiviral properties, weather resistance, impact resistance, and the like.

9 Claims, No Drawings

THERMOPLASTIC RESIN COMPOSITION AND MOLDED PRODUCT MANUFACTURED THEREFROM

CROSS-REFERENCE TO RELATED APPLICATIONS

This application claims priority to and the benefit of International Application No. PCT/KR2021/016188, filed Nov. 9, 2021, which published as WO 2022/124593 on Jun. 16, 2022, and Korean Patent Application No. 10-2020-0173658, filed in the Korean Intellectual Property Office on Dec. 11, 2020, the entire disclosure of each of which is incorporated herein by reference.

TECHNICAL FIELD

The present invention relates to a thermoplastic resin composition and a molded article produced therefrom. More particularly, the present invention relates to a thermoplastic resin composition that exhibits good properties in terms of antiviral properties, weather resistance, impact resistance, and the like, and a molded article produced therefrom.

BACKGROUND ART

Since the coronavirus pandemic, there has been increasing demand for thermoplastic resin products with antiviral properties. In particular, there are increasing cases where thermoplastic resins are used as low-glare exterior materials for indoor home appliances. Specifically, the thermoplastic resins may be applied to refrigerator handles, exteriors of small appliances (air purifiers, humidifiers, and the like), remote controllers, and the like.

In general, copper (Cu) compounds are recognized as materials capable of expressing antiviral performance. However, since application of copper compounds to thermoplastic resin compositions has problems, such as difficult processing, discoloration due to oxidation, and the like, applicable products are very limited. In addition, although a thermoplastic resin composition comprising an existing inorganic antibacterial agent has good antibacterial performance, it has not been confirmed whether the thermoplastic resin composition can express antiviral performance.

Therefore, there is a need for development of a thermoplastic resin composition having good properties in terms of antiviral properties, weather resistance, impact resistance, and the like.

The background technique of the present invention is disclosed in Korean Patent Laid-open Publication No. 10-2020-0065139 and the like.

DISCLOSURE

Technical Problem

It is one aspect of the present invention to provide a thermoplastic resin composition having good properties in terms of antiviral properties, weather resistance, impact resistance, and the like.

It is another aspect of the present invention to provide a molded article formed of the thermoplastic resin composition.

The above and other aspects of the present invention can be achieved by the present invention described below.

Technical Solution

1. One aspect of the present invention relates to a thermoplastic resin composition. The thermoplastic resin composition comprises: about 100 parts by weight of a rubber-modified aromatic vinyl copolymer resin; about 5 to about 25 parts by weight of a polyether-ester-amide block copolymer; about 0.05 to about 1.5 parts by weight of a silver (Ag) compound; and about 1 to about 15 parts by weight of zinc oxide, wherein a weight ratio of the polyether-ester-amide block copolymer to the sum of the silver compound and the zinc oxide (polyether-ester-amide block copolymer: silver compound+zinc oxide) ranges from about 1:0.1 to about 1:2.

2. In embodiment 1, the rubber-modified aromatic vinyl copolymer resin may comprise a rubber-modified vinyl graft copolymer and an aromatic vinyl copolymer resin.

3. In embodiment 1 or 2, the rubber-modified vinyl graft copolymer may be prepared through graft polymerization of a monomer mixture comprising an aromatic vinyl monomer and a vinyl cyanide monomer to a rubber polymer.

4. In embodiment 1 to 3, the polyether-ester-amide block copolymer may be a block copolymer of a reaction mixture comprising: an aminocarboxylic acid, lactam, or diamine-dicarboxylic acid salt having 6 or more carbon atoms; a polyalkylene glycol; and a dicarboxylic acid having 4 to 20 carbon atoms.

5. In embodiments 1 to 4, the silver compound may comprise at least one of metallic silver, silver oxide, silver halide, and a silver ion-containing carrier.

6. In embodiments 1 to 5, a weight ratio of the silver compound to the zinc oxide (silver compound:zinc oxide) may range from about 1:3 to about 1:90.

7. In embodiments 1 to 6, the thermoplastic resin composition may have a virus killing time of about 20 hours or less, as measured on a specimen having a size of 5 cm×5 cm over time at 25° C. and 50% RH in accordance with ISO 21702, in which the specimen is inoculated with porcine epidemic diarrhea virus or influenza A virus fluid.

8. In embodiments 1 to 7, the thermoplastic resin composition may have a color variation ($\Delta E$) of about 3 or less, as calculated according to Equation 1 based on initial color values ($L_0^*$, $a_0^*$, $b_0^*$) measured on an injection-molded specimen having a size of 50 mm×90 mm×2.5 mm using a colorimeter and color values ($L_1^*$, $a_1^*$, $b_1^*$) of the specimen measured in the same manner as above after testing for 300 hours in accordance with ASTM D4459:

$$\text{Color variation } (\Delta E) = \sqrt{(\Delta L^*)^2 + (\Delta a^*)^2 + (\Delta b^*)^2} \qquad \text{[Equation 1]}$$

where $\Delta L^*$ is a difference ($L_1^*-L_0^*$) between L* values before and after testing, $\Delta a^*$ is a difference ($a_1^*-a_0^*$) between a* values before and after testing, and $\Delta b^*$ is a difference ($b_1^*-b_0^*$) between b* values before and after testing.

9. In embodiments 1 to 8, the thermoplastic resin composition may have a notched Izod impact strength of about 14 to about 30 kgf·cm/cm, as measured on a ¼" thick specimen in accordance with ASTM D256.

10. Another aspect of the present invention relates to a molded article. The molded article formed of the thermoplastic resin composition according to any one of Embodiments 1 to 9.

11. In embodiment 10, the molded article may comprise a corrosion surface having a surface roughness of about 1 to about 50 µm on one surface thereof, as measured by a surface roughness meter.

Advantageous Effects

The present invention provides a thermoplastic resin composition having good properties in terms of antiviral properties, weather resistance, impact resistance, and the like, and a molded article produced therefrom.

BEST MODE

Hereinafter, exemplary embodiments of the present invention will be described in detail.

A thermoplastic resin composition according to the present invention comprises: (A) a rubber-modified aromatic vinyl copolymer resin; (B) a polyether-ester-amide block copolymer; (C) a silver (Ag) compound; and (D) zinc oxide.

As used herein to represent a specific numerical range, "a to b" is defined as "≥a and ≤b".

(A) Rubber-Modified Aromatic Vinyl Copolymer Resin

The rubber-modified aromatic vinyl copolymer resin according to one embodiment of the invention may comprise (A1) a rubber-modified vinyl graft copolymer and (A2) an aromatic vinyl copolymer resin.

(A1) Rubber-Modified Vinyl Graft Copolymer

The rubber-modified vinyl graft copolymer according to one embodiment of the invention may be prepared through graft polymerization of a monomer mixture comprising: an aromatic vinyl monomer and a vinyl cyanide monomer to a rubber polymer. For example, the rubber-modified vinyl graft copolymer may be prepared through graft polymerization of the monomer mixture comprising: the aromatic vinyl monomer and the vinyl cyanide monomer to the rubber polymer and, optionally, the monomer mixture may further comprise a monomer for imparting processability and heat resistance. Here, polymerization may be performed by any suitable polymerization method known in the art, such as emulsion polymerization, suspension polymerization, and the like. Further, the rubber-modified vinyl graft copolymer may have a core (rubber polymer)-shell (copolymer of the monomer mixture) structure, without being limited thereto.

In some embodiments, the rubber polymer may include, for example, diene rubbers, such as polybutadiene, poly(acrylonitrile-butadiene), and the like, saturated rubbers prepared by adding hydrogen to the diene rubbers, isoprene rubbers, $C_2$ to $C_{10}$ alkyl (meth)acrylate rubbers, copolymers of $C_2$ to $C_{10}$ alkyl (meth)acrylate rubbers and styrene, ethylene-propylene-diene monomer tripolymer (EPDM), and the like. These may be used alone or as a mixture thereof. For example, the rubber polymer may be diene rubbers, (meth)acrylate rubbers, or the like, specifically a butadiene rubber, a butyl acrylate rubber, or the like.

In addition, the rubber polymer (rubber particles) may have an average particle diameter (particle size) of about 0.05 to about 6 for example, about 0.15 to about 4 specifically about 0.25 to about 3.5 Within this range, the thermoplastic resin composition (molded article) can have good properties in terms of impact resistance, appearance characteristics, and the like. Here, the average (z-average) particle diameter of the rubber polymer (rubber particles) may be measured by a light scattering method in a latex state. Specifically, a rubber polymer latex is filtered through a mesh to remove coagulum generated during polymerization of the rubber polymer. Then, a mixed solution of 0.5 g of the latex and 30 ml of distilled water is placed in a 1,000 ml flask, which in turn is filled with distilled water to prepare a specimen. Then, 10 ml of the specimen is transferred to a quartz cell, followed by measurement of the average particle diameter of the rubber polymer using a light scattering particle analyzer (Malvern Co., Ltd., Nano-zs).

In some embodiments, the rubber polymer may be present in an amount of about 20 to about 80 wt %, for example, about 25 to about 70 wt %, based on 100 wt % of the monomer mixture, and the monomer mixture (comprising the aromatic vinyl monomer and the vinyl cyanide monomer) may be present in an amount of about 20 to about 80 wt %, for example, about 30 to about 75 wt %, based on 100 wt % of the rubber-modified vinyl graft copolymer. Within this range, the thermoplastic resin composition (molded article) can have good impact strength, appearance characteristics, and the like.

In some embodiments, the aromatic vinyl monomer may be graft copolymerizable with the rubber polymer and may include, for example, styrene, α-methyl styrene, β-methyl styrene, p-methyl styrene, p-t-butyl styrene, ethyl styrene, vinyl xylene, monochlorostyrene, dichlorostyrene, dibromostyrene, vinyl naphthalene, and the like. These may be used alone or as a mixture thereof. The aromatic vinyl monomer may be present in an amount of about 10 to about 90 wt %, for example, about 20 to about 80 wt %, based on 100 wt % of the monomer mixture. Within this range, the thermoplastic resin composition (molded article) can have good processability, impact resistance, and the like.

In some embodiments, the vinyl cyanide monomer is a monomer copolymerizable with the aromatic vinyl monomer and may include, for example, acrylonitrile, methacrylonitrile, ethacrylonitrile, phenyl acrylonitrile, α-chloroacrylonitrile, fumaronitrile, and the like. These may be used alone or as a mixture thereof. For example, the vinyl cyanide monomer may include acrylonitrile, methacrylonitrile, and the like. The vinyl cyanide monomer may be present in an amount of about 5 to about 60 wt %, for example, about 10 to about 50 wt %, based on 100 wt % of the monomer mixture. Within this range, the thermoplastic resin composition can have good chemical resistance, mechanical properties, and the like.

In some embodiments, the monomer for imparting processability and heat resistance may include, for example, a $C_1$ to $C_{10}$ alkyl (meth)acrylate, maleic anhydride, N-substituted maleimide, and the like, without being limited thereto. The monomer for imparting processability and heat resistance may be present in an amount of about 60 wt % or less, for example, about 1 to about 50 wt %, based on 100 wt % of the monomer mixture. Within this range, the monomer for imparting processability and heat resistance can impart processability and heat resistance to the thermoplastic resin composition without deterioration in other properties.

In some embodiments, the rubber-modified vinyl graft copolymer may include, for example, a copolymer (g-ABS) prepared by grafting a styrene monomer as the aromatic vinyl compound and an acrylonitrile monomer as the vinyl cyanide compound to a butadiene rubber polymer, a copolymer (g-MBS) prepared by grafting a styrene monomer as the aromatic vinyl compound and methyl methacrylate as the monomer for imparting processability and heat resistance to a butadiene rubber polymer, a copolymer (g-MABS) prepared by grafting a styrene monomer, an acrylonitrile monomer and methyl methacrylate to a butadiene rubber polymer, an acrylate-styrene-acrylonitrile graft copolymer (g-ASA) prepared by grafting a styrene monomer as the aromatic vinyl compound and an acrylonitrile monomer as the vinyl cyanide compound to a butyl acrylate rubber polymer, and the like. For example, g-MBS and the like may be used.

In some embodiments, the rubber-modified vinyl graft copolymer may be present in an amount of about 10 to about 50 wt %, for example, about 20 to about 45 wt %, based on 100 wt % of the rubber-modified aromatic vinyl copolymer resin. Within this range, the thermoplastic resin composition can exhibit good properties in terms of impact resistance, fluidity (molding processability), appearance characteristics, property balance therebetween, and the like.

(A2) Aromatic Vinyl Copolymer Resin

The aromatic vinyl copolymer resin according to one embodiment of the invention may be an aromatic vinyl copolymer resin used in typical rubber-modified aromatic vinyl copolymer resins. For example, the aromatic vinyl copolymer resin may be a polymer of a monomer mixture comprising: an aromatic vinyl monomer and a monomer copolymerizable with the aromatic vinyl monomer.

In some embodiments, the aromatic vinyl copolymer resin may be prepared by mixing the aromatic vinyl monomer with the monomer copolymerizable with the aromatic vinyl monomer, followed by polymerization of the mixture. Here, polymerization may be performed by any suitable polymerization method known in the art, such as emulsion polymerization, suspension polymerization, bulk polymerization, and the like.

In some embodiments, the aromatic vinyl monomer may include, for example, styrene, α-methyl styrene, β-methyl styrene, p-methyl styrene, p-t-butyl styrene, ethyl styrene, vinyl xylene, monochlorostyrene, dichlorostyrene, dibromostyrene, vinyl naphthalene, and the like. These may be used alone or as a mixture thereof. The aromatic vinyl monomer may be present in an amount of about 10 to about 95 wt %, for example, about 20 to about 90 wt %, based on 100 wt % of the aromatic vinyl copolymer resin. Within this range, the thermoplastic resin composition can have good properties in terms of impact resistance, fluidity, and the like.

In some embodiments, the monomer copolymerizable with the aromatic vinyl monomer may comprise at least one of a vinyl cyanide monomer and an alkyl (meth)acrylic monomer. For example, the monomer copolymerizable with the aromatic vinyl monomer may be a vinyl cyanide monomer or may be a vinyl cyanide monomer and an alkyl (meth)acrylic monomer.

In some embodiments, the vinyl cyanide monomer may include, for example, acrylonitrile, methacrylonitrile, ethacrylonitrile, phenyl acrylonitrile, α-chloroacrylonitrile, fumaronitrile, and the like. These may be used alone or as a mixture thereof. For example, the vinyl cyanide monomer may include, for example, acrylonitrile, methacrylonitrile, and the like.

In some embodiments, the alkyl (meth)acrylic monomer may include, for example, (meth)acrylic acid and/or a $C_1$ to $C_{10}$ alkyl (meth)acrylate. These may be used alone or as a mixture thereof. For example, the alkyl (meth)acrylic monomer may be methyl methacrylate, methyl acrylate, and the like.

In some embodiments, the monomer copolymerizable with the aromatic vinyl monomer may be present in an amount of about 5 to about 90 wt %, for example, about 10 to about 80 wt %, based on 100 wt % of the aromatic vinyl copolymer resin. Within this range, the thermoplastic resin composition can have good properties in terms of impact resistance, fluidity, and the like.

In some embodiments, the aromatic vinyl copolymer resin may have a weight average molecular weight (Mw) of about 10,000 to about 300,000 g/mol, for example, about 15,000 to about 150,000 g/mol, as measured by gel permeation chromatography (GPC). Within this range, the thermoplastic resin composition (molded article) can have good mechanical strength, moldability, and the like.

In some embodiments, the aromatic vinyl copolymer resin may be present in an amount of about 50 to about 90 wt %, for example, about 55 to about 80 wt %, based on 100 wt % of the rubber-modified aromatic vinyl copolymer resin.

Within this range, the thermoplastic resin composition can exhibit good properties in terms of impact resistance, fluidity (molding processability), and the like.

(B) Polyether-Ester-Amide Block Copolymer

The polyether-ester-amide block copolymer according to one embodiment of the invention serves to improve antiviral properties, weather resistance, impact resistance, and the like of the thermoplastic resin composition (molded article) together with the silver compound and zinc oxide in the rubber-modified aromatic vinyl copolymer resin, and may be a block copolymer of a reaction mixture comprising: an amino-carboxylic acid, lactam or diamine-dicarboxylic acid salt having 6 or more carbon atoms; a polyalkylene glycol; and a dicarboxylic acid having 4 to 20 carbon atoms.

In some embodiments, the aminocarboxylic acid, lactam, or diamine-dicarboxylic acid salt having 6 or more carbon atoms may include, for example, aminocarboxylic acids, such as ω-aminocaproic acid, ω-aminoenanthic acid, ω-aminocaprylic acid, ω-aminopelargonic acid, ω-aminocapric acid, 1,1-aminoundecanoic acid, 1,2-aminododecanoic acid, and the like; lactams, such as caprolactam, enantolactam, capryl lactam, lauryl lactam, and the like; and salts of diamines and dicarboxylic acids, such as salts of hexamethylenediamine-adipic acid, salts of hexamethylenediamine-isophthalic acid, and the like. For example, 1,2-aminododecanoic acid, caprolactam, and salts of hexamethylenediamine-adipic acid, and the like may be used.

In some embodiments, the polyalkylene glycol may include, for example, polyethylene glycol, poly(1,2- and 1,3-propylene glycol), polytetramethylene glycol, polyhexamethylene glycol, a block or random copolymer of ethylene glycol and propylene glycol, a copolymer of ethylene glycol and tetrahydrofuran, and the like. For example, polyethylene glycol, a copolymer of ethylene glycol and propylene glycol, and the like may be used.

In some embodiments, the dicarboxylic acid having 4 to 20 carbon atoms may include, for example, terephthalic acid, 1,4-cyclohexanedicarboxylic acid, sebacic acid, adipic acid, dodecanocarboxylic acid, and the like.

In some embodiments, a bond between the aminocarboxylic acid, lactam or diamine-dicarboxylic acid salt having 6 or more carbon atoms and the polyalkylene glycol may be an ester bond; a bond between the aminocarboxylic acid, lactam or diamine-dicarboxylic acid salt having 6 or more carbon atoms and the dicarboxylic acid having 4 to 20 carbon atoms may be an amide bond; and a bond between the polyalkylene glycol and the dicarboxylic acid having 4 to 20 carbon atoms may be an ester bond.

In some embodiments, the polyether-ester-amide block copolymer may be prepared by a method well-known in the art, for example, by a method disclosed in JP Patent Publication No. S56-045419 or JP Unexamined Patent Publication No. S55-133424.

In some embodiments, the polyether-ester-amide block copolymer may comprise about 10 to about 95 wt % of the polyether-ester block. Within this range, the thermoplastic resin composition (molded article) can have good impact resistance and the like.

In some embodiments, the polyether-ester-amide block copolymer may be present in an amount of about 5 to about 25 parts by weight, for example, about 8 to about 22 parts by weight, relative to about 100 parts by weight of the rubber-modified aromatic vinyl copolymer resin. If the content of the polyether-ester-amide block copolymer is less than about 5 parts by weight relative to about 100 parts by weight of the rubber-modified aromatic vinyl copolymer resin, the thermoplastic resin composition (molded article) can suffer from deterioration in antiviral properties, impact resistance, and the like, and if the content of the polyether-ester-amide block copolymer exceeds about 25 parts by weight, the thermoplastic resin composition (molded article) can suffer from deterioration in weather resistance, heat stability, and the like.

(C) Silver (Ag) Compound

The silver compound according to one embodiment of the invention serves to improve antiviral properties, weather resistance, impact resistance, and the like of the thermoplastic resin composition (molded article) together with the polyether-ester-amide block copolymer and zinc oxide in the rubber-modified aromatic vinyl copolymer resin. The silver compound is an antibacterial agent and may comprise any compound containing a silver component without limitation and may include, for example, metallic silver, silver oxide, silver halide, a silver ion-containing carrier, combinations thereof, and the like. Among these silver compounds, a silver ion-containing carrier may be used. The carrier may include zeolite, silica gel, calcium phosphate, zirconium phosphate, phosphate-sodium-zirconium, phosphate-sodium-hydrogen-zirconium, and the like. The carrier may have a porous structure. Since the carrier having a porous structure allows silver to be retained therein, the porous structure of the carrier allows not only increase in silver content, but also improvement in silver retention performance. Specifically, the silver compound may be silver sodium hydrogen zirconium phosphate and the like.

In some embodiments, the silver compound may have an average particle size (D50) of about 15 μm or less, for example, about 0.1 to about 12 μm, as measured using a particle size analyzer (Laser Diffraction Particle Size Analyzer LS 13 320, Beckman Coulter).

In some embodiments, the silver compound may be present in an amount of about 0.05 to about 1.5 parts by weight, for example, about 0.1 to about 1.2 parts by weight, relative to about 100 parts by weight of the rubber-modified aromatic vinyl copolymer resin. If the content of the silver compound is less than about 0.05 parts by weight relative to about 100 parts by weight of the rubber-modified aromatic vinyl copolymer resin, the thermoplastic resin composition (molded article) can suffer from deterioration in antiviral properties, antibacterial properties, and the like, and if the content of the silver compound exceeds about 1.5 parts by weight, the thermoplastic resin composition (molded article) can suffer from deterioration in weather resistance, impact resistance, and the like.

(D) Zinc Oxide

The zinc oxide according to the present invention serves to improve antiviral properties, weather resistance, impact resistance, and the like of the thermoplastic resin composition (molded article) together with the polyether-ester-amide block copolymer and zinc oxide in the rubber-modified aromatic vinyl copolymer resin, and may be zinc oxide used in a typical thermoplastic resin composition.

In some embodiments, the zinc oxide is composed of primary particles (single particle) and secondary particles formed by agglomeration of the primary particles, in which the primary particles may have an average particle size (D50) of about 1 to about 50 nm, for example, about 1 to about 30 nm and the secondary particles may have an average particle size (D50) of about 0.1 to about 10 for example, about 0.5 to about 5 as measured using a particle analyzer (Laser Diffraction Particle Size Analyzer LS 13 320, Beckman Coulter). Within this range, thermoplastic resin composition (molded article) can have good properties in terms of antiviral properties, antibacterial properties, impact resistance, and the like.

In some embodiments, the zinc oxide may be present in an amount of about 1 to about 15 parts by weight, for example, about 2 to about 12 parts by weight, relative to about 100 parts by weight of the rubber-modified aromatic vinyl copolymer resin. If the content of the zinc oxide is less than about 1 part by weight relative to about 100 parts by weight of the rubber-modified aromatic vinyl copolymer resin, the thermoplastic resin composition (molded article) can suffer from deterioration in antiviral properties, antibacterial properties, and the like, and if the content of the zinc oxide exceeds about 15 parts by weight, the thermoplastic resin composition (molded article) can suffer from deterioration in impact resistance, coloration, and the like.

In some embodiments, the weight ratio of the polyether-ester-amide block copolymer to the sum of the silver compound and the zinc oxide (polyether-ester-amide block copolymer:silver compound+zinc oxide) may range from about 1:0.1 to about 1:2, for example, about 1:0.15 to about 1:1.5. If the weight ratio is less than about 1:0.1, the thermoplastic resin composition (molded article) can suffer from deterioration in antiviral properties, weather resistance, and the like, and if the weight ratio exceeds about 1:2, the thermoplastic resin composition (molded article) can suffer from deterioration in antiviral properties, impact resistance, and the like.

In some embodiments, the weight ratio of the silver compound to the zinc oxide (silver compound:zinc oxide) may range from about 1:3 to about 1:90, for example, about 1:3.3 to about 1:80. Within this range, the thermoplastic resin composition (molded article) can exhibit better properties in terms of antiviral properties, weather resistance, impact resistance, and the like.

The thermoplastic resin composition according to one embodiment of the invention may further comprise additives used for typical thermoplastic resin compositions. Examples of the additives may include flame retardants, fillers, antioxidants, anti-dripping agents, lubricants, release agents, nucleating agents, stabilizers, pigments, dyes, mixtures thereof, and the like, without being limited thereto. The additives may be present in an amount of about 0.001 to about 40 parts by weight, for example, about 0.1 to about 10 parts by weight, relative to about 100 parts by weight of the rubber-modified aromatic vinyl copolymer resin.

The thermoplastic resin composition according to one embodiment of the invention may be prepared in pellet form by mixing the aforementioned components, followed by melt extrusion at about 200 to about 280° C., for example, about 220 to about 250° C., using a typical twin-screw extruder.

In some embodiments, the thermoplastic resin composition may have a virus killing time of about 20 hours or less, for example, about 8 to about 16 hours, as measured on a specimen having a size of 5 cm×5 cm over time at 25° C. and 50% RH in accordance with ISO 21702, in which the specimen is inoculated with porcine epidemic diarrhea virus or influenza A virus fluid.

In some embodiments, the thermoplastic resin composition may have a color variation (4E) of about 3 or less, for example, about 1.5 to about 2.5, as calculated according to Equation 1 based on initial color values ($L_0^*$, $a_0^*$, $b_0^*$) measured on an injection-molded specimen having a size of 50 mm×90 mm×2.5 mm using a colorimeter and color values ($L_1^*$, $a_1^*$, $b_1^*$) of the specimen measured in the same manner as above after testing for 300 hours in accordance with ASTM D4459.

$$\text{Color variation } (\Delta E) = \sqrt{(\Delta L^*)^2 + (\Delta a^*)^2 + (\Delta b^*)^2} \qquad \text{[Equation 1]}$$

where $\Delta L^*$ is a difference $(L_1^*-L_0^*)$ between L* values before and after testing, $\Delta a^*$ is a difference $(a_1^*-a_0^*)$ between a* values before and after testing, and $\Delta b^*$ is a difference $(b_1^*-b_0^*)$ between b* values before and after testing.

In some embodiments, the thermoplastic resin composition may have a notched Izod impact strength of about 14 to about 30 kgf·cm/cm, for example, about 16 to about 25 kgf·cm/cm, as measured on a ¼" thick specimen in accordance with ASTM D256.

A molded article according to the present invention is formed of the thermoplastic resin composition set forth above. The thermoplastic resin composition may be prepared in pellet form. The prepared pellets may be produced into various molded products (articles) by various molding methods, such as injection molding, extrusion molding, vacuum molding, casting, and the like. These molding methods are well known to those skilled in the art.

In some embodiments, the molded article has good properties in terms of antiviral properties, weather resistance, impact resistance, balance therebetween, and the like, and thus can be advantageously used as antiviral exterior materials subjected to frequent body contact.

In some embodiments, the molded article may comprise a corrosion surface having a surface roughness of about 1 to about 50 μm, for example, about 5 to about 40 μm, on one surface thereof, as measured by a surface roughness meter. A method for forming a corrosion surface is well known to a person having ordinary knowledge in the art. Within this range of surface roughness, the molded article can exhibit better antiviral properties, and the like, and can provide a low gloss product.

In some embodiments, the molded article including the corrosion surface may have a corrosion surface gloss of about 0.5 to about 40%, for example, about 1 to about 20%, as measured on a 3.2 mm thick specimen at angle of 85° in accordance with ASTM D523. Within this range, the molded article can have better properties in terms of antiviral properties, weather resistance, and the like.

MODE FOR INVENTION

Next, the present invention will be described in more detail with reference to some examples. It should be understood that these examples are provided for illustration only and are not to be construed in any way as limiting the invention.

Example

Details of components used in Examples and Comparative Examples are as follows.

(A) Rubber-Modified Aromatic Vinyl Copolymer Resin

A rubber-modified aromatic vinyl copolymer resin prepared by mixing 25 wt % of (A1) a rubber-modified vinyl graft copolymer and 75 wt % of (A2) an aromatic vinyl copolymer resin was used.

(A1) Rubber-Modified Vinyl Graft Copolymer

A core-shell graft copolymer (g-ABS) obtained through graft polymerization of 42 wt % of styrene and acrylonitrile (weight ratio: 75/25) to 58 wt % of butadiene rubber having an average particle diameter of 0.3 μm was used.

(A2) Aromatic Vinyl Copolymer Resin

A SAN resin (weight average molecular weight: 120,000 g/mol) prepared through polymerization of 70 wt % of styrene and 30 wt % of acrylonitrile was used.

(B) Block Copolymer (B1) A polyamide-6-polyethylene oxide block copolymer (PA6-b-PEO, Manufacturer: Sanyo Chemical Co., Ltd., Product Name: PELECTRON AS) was used.

(B2) A polypropylene-polyethylene oxide block copolymer (PP-b-PEO, Manufacturer: Sanyo Chemical Co., Ltd., Product Name: PELECTRON PVL, index of refraction: 1.50) was used.

(C) Silver (Ag) Compound

Silver phosphate glass (Manufacturer: Fuji Chemical Industries Ltd., Product Name: BM-102SD) was used.

(D) Zinc Oxide

Zinc oxide (Manufacturer: SH Evergy & Chemical Co., Ltd., Product Name: ANYZON) was used.

Examples 1 to 7 and Comparative Examples 1 to 10

The above components were mixed in amounts as listed in Tables 1, 2 and 3 and subjected to extrusion at 230° C., thereby preparing pellets. Extrusion was performed using a twin-screw extruder (L/D=36, diameter: 45 mm) and the pellets were dried at 80° C. for 2 hours or more and injection-molded in a 6 oz. injection molding machine (molding temperature: 230° C., mold temperature: 60° C.), thereby preparing specimens. The specimens were evaluated as to the following properties by the following method, and results are shown in Tables 1, 2 and 3.

Property Evaluation (1) Antiviral properties: Virus killing time (unit: hour) was measured on a specimen having a size of 5 cm×5 cm over time at 25° C. and 50% RH in accordance with ISO 21702, in which the specimen was inoculated with porcine epidemic diarrhea virus or influenza A virus fluid.

(2) Color variation ($\Delta E$): Color variation ($\Delta E$) was calculated according to Equation 1 based on initial color values ($L_0^*$, $a_0^*$, $b_0^*$) measured on an injection-molded specimen having a size of 50 mm×90 mm×2.5 mm using a colorimeter (CM-3700A, KONICA MINOLTA) and color values ($L_1^*$, $a_1^*$, $b_1^*$) measured in the same manner as above after testing for 300 hours in accordance with ASTM D4459.

$$\text{Color variation } (\Delta E) = \sqrt{(\Delta L^*)^2 + (\Delta a^*)^2 + (\Delta b^*)^2}, \qquad \text{[Equation 1]}$$

where $\Delta L^*$ is a difference $(L_1^*-L_0^*)$ between L* values before and after testing, $\Delta a^*$ is a difference $(a_1^*-a_0^*)$ between a* values before and after testing, and $\Delta b^*$ is a difference $(b_1^*-b_0^*)$ between b* values before and after testing.

(3) Notched Izod impact strength (unit: kgf·cm/cm): Notched Izod impact strength was measured on a ¼" thick specimen in accordance with ASTM D256.

TABLE 1

| | Example | | | | | | |
|---|---|---|---|---|---|---|---|
| | 1 | 2 | 3 | 4 | 5 | 6 | 7 |
| (A) (parts by weight) | 100 | 100 | 100 | 100 | 100 | 100 | 100 |
| (B1) (parts by weight) | 8 | 15 | 22 | 15 | 15 | 15 | 15 |
| (B2) (parts by weight) | — | — | — | — | — | — | — |
| (C) (parts by weight) | 0.6 | 0.6 | 0.6 | 0.1 | 1.2 | 0.6 | 0.6 |

TABLE 1-continued

| | Example | | | | | | |
|---|---|---|---|---|---|---|---|
| | 1 | 2 | 3 | 4 | 5 | 6 | 7 |
| (D) (parts by weight) | 8 | 8 | 8 | 8 | 8 | 2 | 12 |
| PEDV killing time | 16 | 12 | 8 | 15 | 10 | 15 | 10 |
| Influenza A killing time | 16 | 12 | 8 | 15 | 10 | 15 | 10 |
| Color variation (ΔE) | 1.5 | 1.8 | 2.2 | 1.6 | 2.5 | 2 | 1.6 |
| Notched Izod impact strength | 16 | 18 | 20 | 22 | 16 | 19 | 18 |

TABLE 2

| | Comparative Example | | | | |
|---|---|---|---|---|---|
| | 1 | 2 | 3 | 4 | 5 |
| (A) (parts by weight) | 100 | 100 | 100 | 100 | 100 |
| (B1) (parts by weight) | 4 | 28 | — | 15 | 15 |
| (B2) (parts by weight) | — | — | 15 | — | — |
| (C) (parts by weight) | 0.6 | 0.6 | 0.6 | 0.01 | 2 |
| (D) (parts by weight) | 8 | 8 | 8 | 8 | 8 |
| PEDV killing time | 24 | 7 | 12 | 22 | 10 |
| Influenza A killing time | 24 | 7 | 12 | 22 | 10 |
| Color variation (ΔE) | 1.5 | 3.5 | 1.8 | 1.2 | 4 |
| Notched Izod impact strength | 13 | 22 | 12 | 22 | 14 |

TABLE 3

| | Comparative Example | | | | | |
|---|---|---|---|---|---|---|
| | 6 | 7 | 8 | 9 | 10 | 11 |
| (A) (parts by weight) | 100 | 100 | 100 | 100 | 100 | 100 |
| (B1) (parts by weight) | 15 | 15 | 25 | 5 | — | — |
| (B2) (parts by weight) | — | — | — | — | — | — |
| (C) (parts by weight) | 0.6 | 0.6 | 0.05 | 1.5 | 0.6 | — |
| (D) (parts by weight) | 0.5 | 16 | 1 | 15 | 8 | — |
| PEDV killing time | 22 | 10 | 24 | 24 | 48 | 72 |
| Influenza A killing time | 22 | 10 | 24 | 24 | 48 | 72 |
| Color variation(ΔE) | 3.5 | 1.2 | 3.2 | 1.5 | 1.5 | 4 |
| Notched Izod impact strength | 20 | 12 | 22 | 13 | 22 | 27 |

From the results, it could be seen that the thermoplastic resin compositions according to the present invention exhibited good properties in terms of antiviral properties (virus killing time), weather resistance (color variation (ΔE)), impact resistance (notched Izod impact strength), and the like.

Conversely, it could be seen that the resin composition of Comparative Example 1 containing an insufficient amount of the polyether-ester-amide block copolymer suffered from deterioration in antiviral properties, impact resistance, and the like; the resin composition of Comparative Example 2 containing an excess of the polyether-ester-amide block copolymer suffered from deterioration in weather resistance and the like; and the resin composition of Comparative Example 3 prepared using the polypropylene-polyethylene oxide block copolymer (B2) instead of the polyether-ester-amide block copolymer according to the present invention suffered from deterioration in impact resistance and the like. In addition, it could be seen that the resin composition of Comparative Example 4 containing an insufficient amount of the silver compound suffered from deterioration in antiviral properties, and the like; the resin composition of Comparative Example 5 containing an excess of the silver compound suffered from deterioration in weather resistance, impact resistance, and the like; the resin composition of Comparative Example 6 containing an insufficient amount of the zinc oxide suffered from deterioration in antiviral properties, weather resistance, and the like; and the resin composition of Comparative Example 7 containing an excess of the zinc oxide suffered from deterioration in impact resistance and the like. In addition, it could be seen that, even with the polyether-polyester-amide block copolymer (B1), the silver compound (C) and the zinc oxide (D) within the ranges according to the present invention, the resin composition of Comparative Example 8 having a lower weight ratio (1:0.042) of the polyether-polyester-amide block copolymer (B1) to the sum of the silver compound (C) and the zinc oxide (D) (B1:C+D) than the weight ratio according to the present invention suffered from deterioration in antiviral properties, weather resistance, and the like; and the resin composition of Comparative Example 9 having a greater weight ratio (1:3.3) suffered from deterioration in antiviral properties, impact resistance, and the like. In addition, it could be seen that the thermoplastic resin composition of Comparative Example 10 free from the polyether-ester-amide block copolymer suffered from deterioration in antiviral properties and the like; and the thermoplastic resin composition of Comparative Example 11 prepared without the polyether-ester-amide block copolymer, the silver compound and zinc oxide suffered from deterioration in antiviral properties, weather resistance, and the like.

Although the present invention has been described with reference to some example embodiments, it should be understood by those skilled in the art that these embodiments are given by way of illustration only, and that various modifications, variations and alterations can be made without departing from the spirit and scope of the invention. Therefore, the embodiments should not be construed as limiting the technical spirit of the present invention, but should be construed as illustrating the technical spirit of the present invention. The scope of the invention should be interpreted according to the following appended claims as covering all modifications or variations derived from the appended claims and equivalents thereto.

The invention claimed is:

1. A thermoplastic resin composition comprising:

about 100 parts by weight of a rubber-modified aromatic vinyl copolymer resin;

about 5 to about 25 parts by weight of a polyether-ester-amide block copolymer;

about 0.05 to about 1.5 parts by weight of a silver (Ag) compound; and about 1 to about 15 parts by weight of zinc oxide, wherein a weight ratio of the polyether-ester-amide block copolymer to the sum of the silver compound and the zinc oxide (polyether-ester-amide block copolymer: silver compound+zinc oxide) ranges from about 1:0.15 to about 1:1.5, and wherein the thermoplastic resin composition has a virus killing time of about 20 hours or less, as measured on a specimen having a size of 5 cm×5 cm over time at 25° C. and 50% RH in accordance with ISO 21702, in which the specimen is inoculated with porcine epidemic diarrhea virus or influenza A virus fluid, and wherein the thermoplastic resin composition has a color variation (ΔE) of about 3 or less, as calculated according to Equation 1 based on initial color values ($L_0^*$, $a_0^*$, $b_0^*$) measured on an injection-molded specimen having a size of 50 mm×90 mm×2.5 mm using a colorimeter and color values ($L_1^*$, $a_1^*$, $b_1^*$) of the specimen measured in the same manner as above after testing for 300 hours in accordance with ASTM D4459:

$$\text{Color variation } (\Delta E) = \sqrt{(\Delta L^*)^2 + (\Delta a^*)^2 + (\Delta b^*)^2} \qquad \text{[Equation 1]}$$

where $\Delta L^*$ is a difference $(L_1^* - L_0^*)$ between $L^*$ values before and after testing, $\Delta a^*$ is a difference $(a_1^* - a_0^*)$ between $a^*$ values before and after testing, and $\Delta b^*$ is a difference $(b_1^* - b_0^*)$ between $b^*$ values before and after testing.

2. The thermoplastic resin composition according to claim 1, wherein the rubber-modified aromatic vinyl copolymer resin comprises a rubber-modified vinyl graft copolymer and an aromatic vinyl copolymer resin.

3. The thermoplastic resin composition according to claim 2, wherein the rubber-modified vinyl graft copolymer is prepared through graft polymerization of a monomer mixture comprising an aromatic vinyl monomer and a vinyl cyanide monomer to a rubber polymer.

4. The thermoplastic resin composition according to claim 1, wherein the polyether-ester-amide block copolymer is a block copolymer of a reaction mixture comprising: an aminocarboxylic acid, lactam, or diamine-dicarboxylic acid salt having 6 or more carbon atoms; a polyalkylene glycol; and a dicarboxylic acid having 4 to 20 carbon atoms.

5. The thermoplastic resin composition according to claim 1, wherein the silver compound comprises at least one of metallic silver, silver oxide, silver halide, and a silver ion-containing carrier.

6. The thermoplastic resin composition according to claim 1, wherein a weight ratio of the silver compound to the zinc oxide (silver compound: zinc oxide) ranges from about 1:3 to about 1:90.

7. The thermoplastic resin composition according to claim 1, wherein the thermoplastic resin composition has a notched Izod impact strength of about 14 to about 30 kgf·cm/cm, as measured on a ¼" thick specimen in accordance with ASTM D256.

8. A molded article formed of the thermoplastic resin composition according to claim 1.

9. The molded article according to claim 8, wherein the molded article comprises a corrosion surface having a surface roughness of about 1 to about 50 μm on one surface thereof, as measured by a surface roughness meter.

* * * * *